Oct. 9, 1956

W. W. DELINE 2,765,686

SPLIT SHOT TOOL WITH RESERVOIR

Filed Aug. 4, 1954

INVENTOR.
Walter W. Deline
BY
ATTORNEY

United States Patent Office 2,765,686
Patented Oct. 9, 1956

2,765,686

SPLIT SHOT TOOL WITH RESERVOIR

Walter W. Deline, Denver, Colo.

Application August 4, 1954, Serial No. 447,773

3 Claims. (Cl. 81—15)

This invention relates to a tool for carrying and applying split shot to fishing lines and leaders and is more particularly designed as an improvement over the split shot applying tool shown in applicant's prior Patent No. 2,651,958. This invention has for its principal object the provision of a unitary device which will hold a supply of split shot and which will deliver the shot one at a time to a line-receiving position, and which will close the split shot on the line or leader.

Another object of the invention is to so construct the device that the shot contained therein cannot fall therefrom until they have been individually and successively closed upon the line, so as to prevent accidental loss of the shot.

A further object of the invention is to so construct the device that it will not require any more space than a conventional fountain pen, so that it may be carried in a convenient pocket by the fisherman.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 9 is a similar detail view, illustrating a split shot clamped closed upon a fishing line by the improved device;

Figure 1:
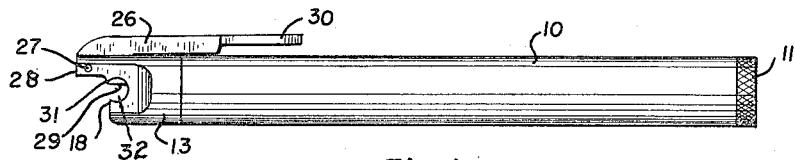
Fig. 1 is a side view of the improved spit shot tool.
Figure 2:
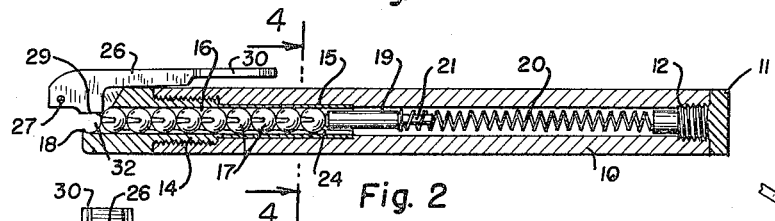
Fig. 2 is a longitudinal section therethrough.
Figure 3:
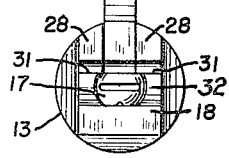
Fig. 3 is an enlarged, front end view of the tool.
Figure 4:
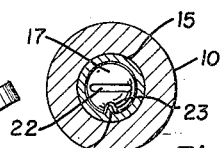
Fig. 4 is a similarly enlarged cross-section therethrough, taken on the line 4—4, Fig. 2.

The first form of the improved split shot retaining and clamping tool employs a tubular barrel 10 closed at its rearward extremity by means of a knurled cap 11. The cap 11 is provided with a threaded stem portion 12 which is threaded into the rearward extremity of the barrel 10. A cylindrical shot-closing fitting 13 is mounted on the forward extremity of the barrel 10.

The fitting 13 is formed with a tubular threaded nipple 14 which is threaded into the forward extremity of the barrel 10. A tubular sleeve 15 is formed on and extends concentrically from the nipple 14 into the tubular barrel 10 and communicates with a cylindrical shot passage 16 in the fitting 13 so that split shot, as indicated at 17, can pass continuously from the sleeve 15 through the fitting 13 to the forward extremity of the latter, where they are stopped by means of an upwardly extending lower stop abutment 18 and two downwardly extending upper stop abutments 31.

A spring plunger 19 constantly urges an aligned row of shot 17 forwardly in the sleeve 15 and the shot passage 16 in the fitting 13. The plunger 19 is actuated by means of a relatively long compression spring 20 mounted at its one extremity on a plunger stem 21 formed on the plunger 19, and acting at its other extremity against the stem portion 12 of the cap 11.

The split shot 17 are provided with the conventional split 22 for receiving the fishing line, and with a guide notch 23 adapted to engage and slide along a longitudinally extending spline 24 formed or mounted in the sleeve 15 and in the shot passage 16. The spline 24 prevents rotation of the shot 17 and acts to maintain the line of splits 22 in a forward position for convenient reception of a fishing line or leader, such as indicated at 25 on the drawing.

Figure 6:
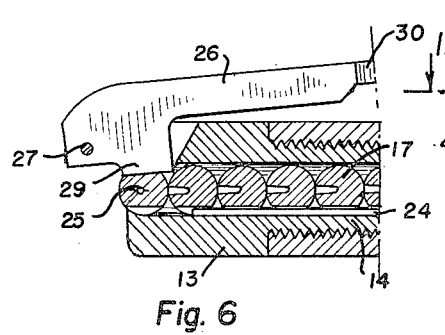
Fig. 6 is a similar view, illustrating the shot closed upon the line.

A shot-closing lever 26 is mounted on a hinge pin 27 in a bifurcated forward extremity 28 on the fitting 13. The lever 26 is formed with a shot-closing jaw portion 29 positioned to swing into engagement with the foremost shot 17 when the lever 26 is squeezed by the user's thumb toward the barrel 10 so as to compress the foremost shot and close the split 22 on the line 25, as shown in Fig. 6. The lever is preferably provided with a flat thumb pad 30 for receiving the thumb of the user.

Figure 5:
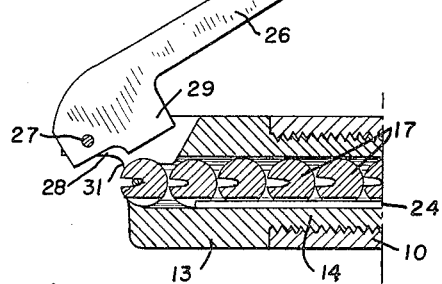
Fig. 5 is an enlarged, longitudinal section through the delivery extremity of the tool, illustrating a split shot in place on a fishing line in position to be closed and locked thereon.
Figure 7:
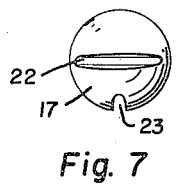
Figs. 7 and 8 are still further enlarged, detail views, illustrating the type of split shot employed in the improved device.
Figure 8:
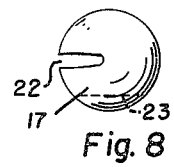

The abutments 18 and 31 prevent the shot from being forced from the fitting 13 until they are compressed to a lesser vertical diameter, as shown in Fig. 5, so as to allow them to pass between the abutments and from the tool. At this time, however, they are clamped closed upon the fishing line or leader so that they will not be lost or wasted. A throat opening 32 extends transversally through the fitting 13 rearwardly of the abutments 18 and 31 through which the terminal shot is visible and through which the fishing line can be extended into the shot receiving split 22.

Figure 11:
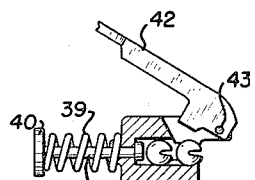
Fig. 11 is a horizontal section through the alternate form, taken on the line 11—11, Fig. 10.
Figure 10:
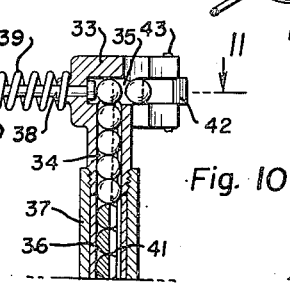
Fig. 10 is a vertical section through the upper portion of an alternate form of the invention.

The alternate form of the invention illustrated in Figs. 10 and 11 is similar to the preceding form as far as the mechanism for closing the split shot on the line is concerned. In this form, however, the normal split 22 in the shot 17 is used to guide the shot through the tool and the guide notch 23 is unnecessary.

The alternate form employs a head fitting 33 having a vertical shot passage 34 and a horizontal shot passage 35 joining each other at substantially a right angle. The fitting is provided with a shot tube 36 similar to the previous shot tube or tubular sleeve 15 and is adapted to be threaded into the extremity of a spring containing barrel 37 similar to the previously described barrel 10.

A plunger 38 is slidably mounted in the fitting 33 in axial alignment with the horizontal passage 35 and is constantly urged outwardly by means of a suitable compression spring 39 acting against a finger button 40 on the plunger. A longitudinally extending spline 41 is placed along the inner wall of the shot tube 36 and the vertical passage 34.

A clamping lever 42 is pivotally mounted upon a hinge pin 43 adjacent the discharge extremity of the horizontal passage 35. This lever is exactly similar to the previously described lever 26 and acts against the foremost shot 17 in the horizontal passage to close the split therein on the line as previously described.

In the alternate form, the shot are placed in the shot tube 36 with their splits 22 receiving the spline 41. Thus, as the shot travel upwardly under the influence of a spring, such as the spring 20 of the previous form, they will be held with their splits facing forwardly in a vertical position.

When the plunger 38 is depressed, the uppermost shot in the vertical shot passage 34 will be forced forwardly into clamping position in the horizontal passage 35 with its split faced outwardly to receive the line or leader. The line is then placed in the split and the lever is actuated to close the shot split on the line as in the previously described form.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A fisherman's split shot tool comprising: a fitting having a tubular shot passage extending therethrough and opening to the forward extremity thereof and adapted to contain a row of aligned split shot; a tubular barrel attached to said fitting and provided with an elongated shot reservoir in alignment with said shot passage; means in said barrel urging said row of shot forwardly from said reservoir and into said passage; an abutment formed on said fitting and extending into said shot passage at the forward extremity of and at one side of said passage and acting to prevent the foremost shot from discharging from said passage; a lever hingedly mounted on said fitting forwardly of said abutment and extending rearwardly alongside said fitting; and a shot-closing jaw formed on said lever rearwardly of its hinge mounting and positioned to extend into the side of said passage opposite said abutment when said lever is swung toward said fitting to compress the foremost shot of said row to close the split therein, so as to reduce the size thereof sufficiently to allow said foremost shot to pass said abutment and from said fitting.

2. A fisherman's split shot tool as described in claim 1 in which the shot-closing jaw extends through a slot in the wall of said passage sufficiently far to prevent the split shot following the shot which has been closed from reaching said abutment.

3. A fisherman's split shot tool as described in claim 2 having an additional abutment positioned on each side of the slot containing the shot-closing jaw to cooperate with the first abutment in maintaining the foremost shot in place until the latter is compressed by the shot-closing jaw in consequence of the movement of said lever toward said fitting.

References Cited in the file of this patent

UNITED STATES PATENTS

| | | |
|---|---|---|
| 1,306,714 | Parker | June 17, 1919 |
| 1,355,465 | Gibbons | Oct. 12, 1920 |
| 2,194,748 | Glasser et al. | Mar. 26, 1940 |
| 2,440,040 | Burton | Apr. 20, 1948 |
| 2,485,874 | Forst | Oct. 25, 1949 |
| 2,627,769 | Anderson et al. | Feb. 10, 1953 |
| 2,651,958 | Deline | Sept. 15, 1953 |

FOREIGN PATENTS

| | | |
|---|---|---|
| 46,879 | Switzerland | Apr. 24, 1909 |